United States Patent [19]

Frenette

[11] 4,099,636

[45] Jul. 11, 1978

[54] INSTANT LOAD RELEASE METHOD

[75] Inventor: Lionel G. Frenette, Hudson, N.H.

[73] Assignee: Victor T. Guertin, Trustee, Nashua, N.H.

[21] Appl. No.: 796,899

[22] Filed: May 16, 1977

Related U.S. Application Data

[62] Division of Ser. No. 650,256, Jan. 19, 1976, Pat. No. 4,034,880.

[51] Int. Cl.² .............................................. B60P 1/04
[52] U.S. Cl. .................................................. 214/152
[58] Field of Search ................... 214/44 B, 82, 83.22, 214/152, 510; 298/1 B

[56] References Cited

U.S. PATENT DOCUMENTS

| 3,125,231 | 3/1964 | Mortland | 214/510 X |
| 3,975,052 | 8/1976 | Pitts | 214/82 X |

*Primary Examiner*—Robert G. Sheridan
*Attorney, Agent, or Firm*—Pearson & Pearson

[57] ABSTRACT

A large, sealed, roll-off container of compacted waste is provided with a transversely extending, angle iron, ejection bar which is instantly, progressively pulled rearwardly along the floor of the container by a cable attached to the frame of a tilt bed vehicle, as the tilt bed is lifted to discharge the compacted load through a rear opening. A pair of extension cables are normally looped around the front end of the load and pressed against the inside wall surfaces of the container by the force of compaction. These cables compress the front of the load to free it from adherence to the walls immediately upon tilt.

5 Claims, 7 Drawing Figures

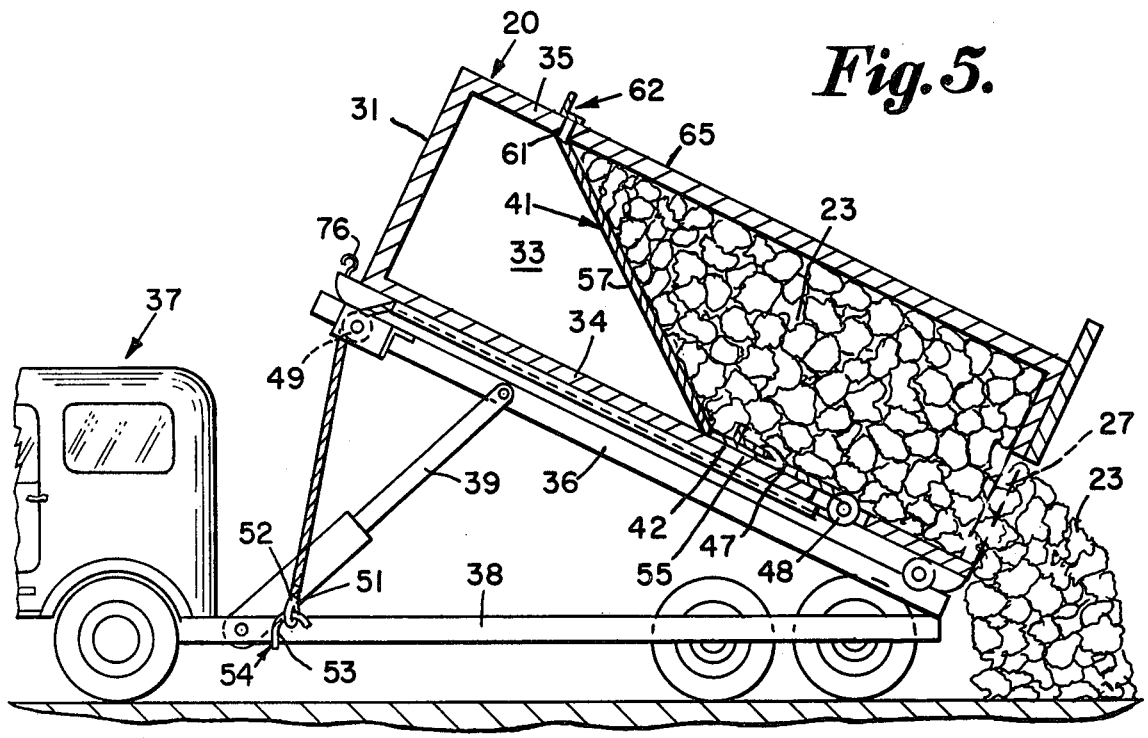
*Fig.5.*
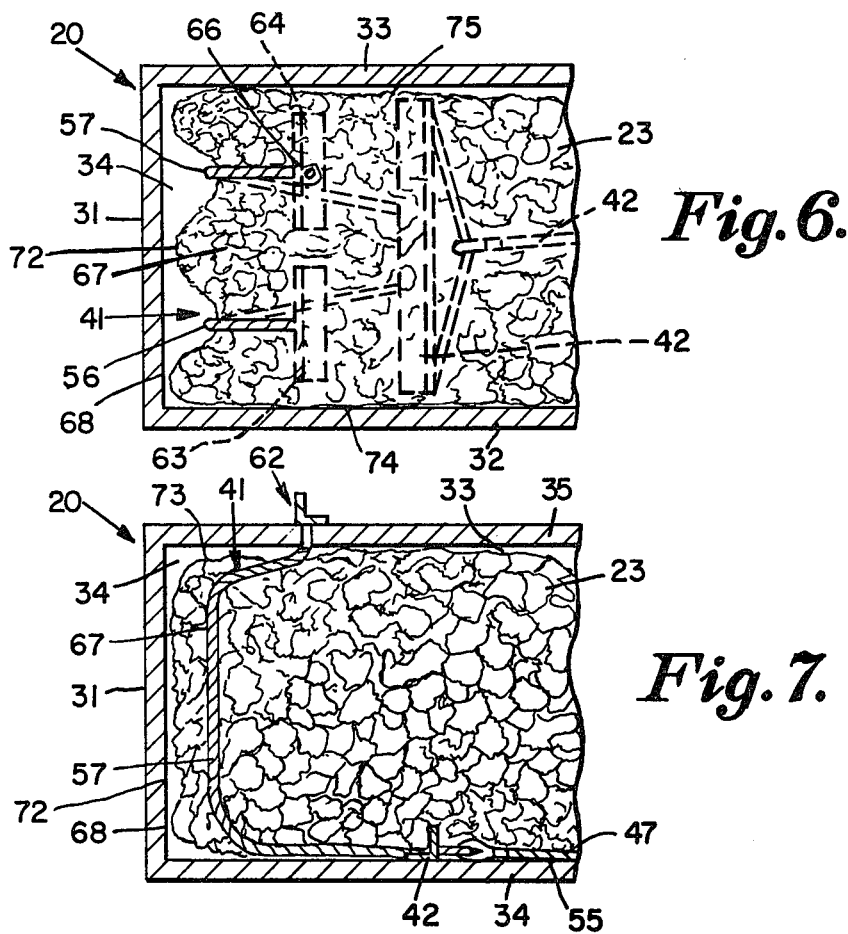
*Fig.6.*
*Fig.7.*

INSTANT LOAD RELEASE METHOD

CROSS-REFERENCE TO RELATED APPLICATION

This application is a division of application Ser. No. 650,256, filed Jan. 19, 1976, now U.S. Pat. No. 4,034,880.

BACKGROUND OF THE INVENTION

Elongated, sealed, roll-off containers, stationed with powerful piston type compacters at business establishments for collecting and compacting waste are emptied by being transported to suitable dump on a tilt bed vehicle. Such containers have an openable rear closure and are tilted upwardly by the tilt bed and hydraulic mechanism on the vehicle to discharge the compacted waste load by gravity through the rear opening.

The waste is compacted at a pressure of 20 tons per square inch, and when it includes garbage, or other sticky material, or when it includes liquids capable of freezing in northern climates, the compacted waste tends to stick to the inside faces of the front of the container and fail to discharge by gravity.

PRIOR ART

It has heretofore been proposed to mount a horizontal cleaning plate transversely of the bed of a dump box of a dump truck by pull cable connection to the frame so that the plate will move rearwardly as the dump box is lifted in U.S. Pat. No. 3,164,410 to Robinson of Jan. 5, 1965.

A similar mechanism is disclosed in U.S. Pat. No. 3,626,489 to Pioch of Dec. 1971 wherein the cleaning member is a tube of relatively large diameter and a lost motion mechanism is provided to delay the movement of the ejection bar until the tilt bed is midway of its tilt.

SUMMARY OF THE INVENTION

In this invention, the ejection bar, or cleaner plate, is a transversely extending angle iron with the vertical web facing rearwardly so that its upstanding web will serve as a scraper blade. At least one pull cable extends rearwardly from the cargo ejecting angle iron along the floor of the container, thence forwardly under the floor and thence downwardly to an anchor on the frame so that the angle iron moves instantly and continuously as the compacted container is lifted by the tilt bed.

Unlike the above devices of the prior art however, the system of this invention includes a pair of extension cables, each looping forwardly from one of the opposite sides of the ejection bar, thence upwardly along the front inside of the container and thence rearwardly under the roof to anchoring means. Also, unlike such devices, there is no costly and complicated return mechanism for the ejection bar, or for the cables, because the cables are intended to initially be loose and to be moved rearwardly with the bar by the tremendous pressure of the waste being compacted from rear to front of the container.

Thus, as the waste is compacted the extension cables are pressed forwardly of the container until they are each looped against the wall surfaces and are encompassing the forward end of the compacted load at one or more feet inwardly from the side walls of the container.

It will be seen that the instant pull on the ejection bar not only scrapes the floor of the container from front to rear but also exerts an instant pull on the side by side extension cables which tends to compress and squeeze the front end of the compacted load, thereby distorting the exterior surfaces of the load away from the adjacent inside surfaces of the container to which they may have been adhered. This distortion and compression of the front end of the load, together with the separation of the bottom of the load from the floor by the angle iron ejection bar, gives the necessary instant load release to enable the force of gravity to discharge the compacted waste from the container.

BRIEF DESCRIPTION OF THE DRAWING

FIG. 5 is a view similar to FIG. 4 showing the roll-off container lifted to a greater angle and the load discharging;

FIG. 6 is a diagrammatic plan view and

FIG. 7 is a diagrammatic side view in section showing the action of the extension cables in compressing the front end of the compacted load to pull the trash away from the walls.

DESCRIPTION OF THE PREFERRED EMBODIMENT

Figure 1:
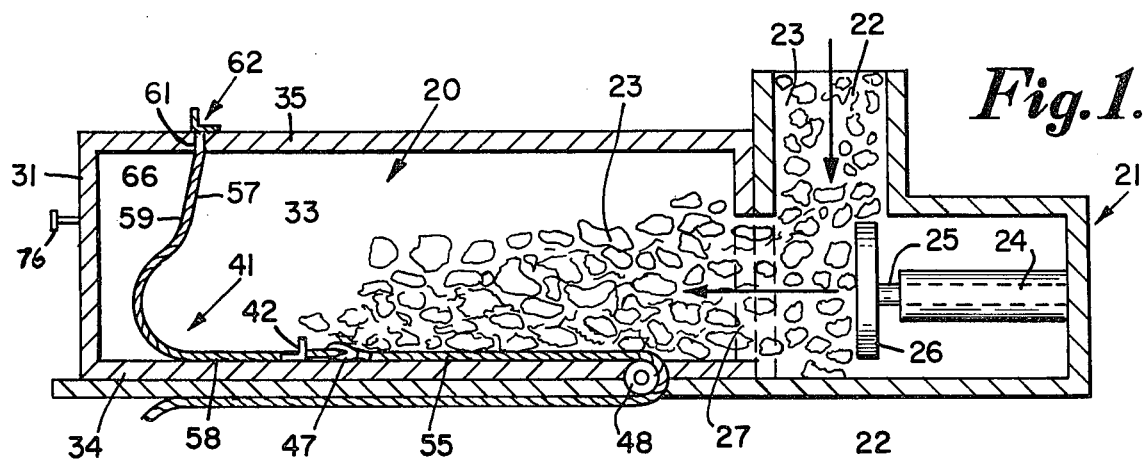
FIG. 1 is side elevational view, in half section of a typical rubbish compactor system with the instant load release of the invention installed in the compacted waste, roll-off container.

A typical sealed, elongated, roll-off container 20 is shown in the drawings, as used with a compactor 21 at a commercial establishment such as a supermarket.

The compactor 21 is of a well known type such as a BFI compactor system made by Browning-Ferris Industries, Inc., of Houston, Texas, and includes a hopper 22 for receiving trash, waste 23, etc., an hydraulic cylinder 24, piston 25 and compactor piston head 26, powered by a source not shown and arranged to compact the waste 23 into the container 20, through the rear opening 27. The roll-off container 20 is sealed for transport by the openable rear door 28 and includes the front wall 31, side walls 32 and 33, floor 34 and top wall, or roof, 35.

Figure 3:
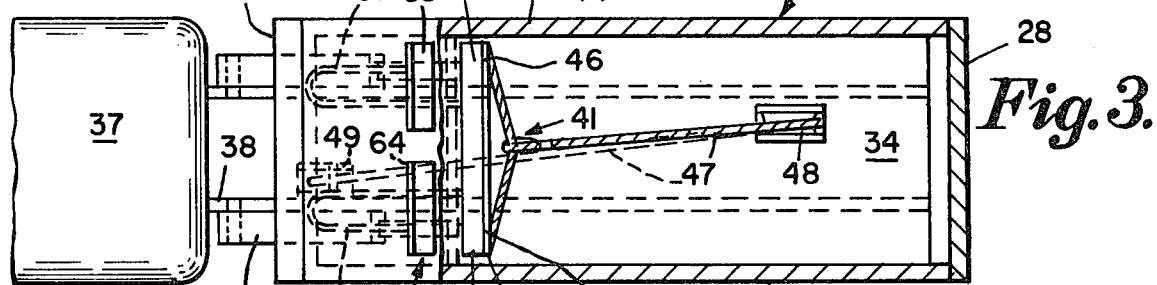
FIG. 3 is a plan view, with parts broken away, of the load release mechanism of the invention with the trash container mounted on a truck for delivery to a dumping area.
Figure 4:
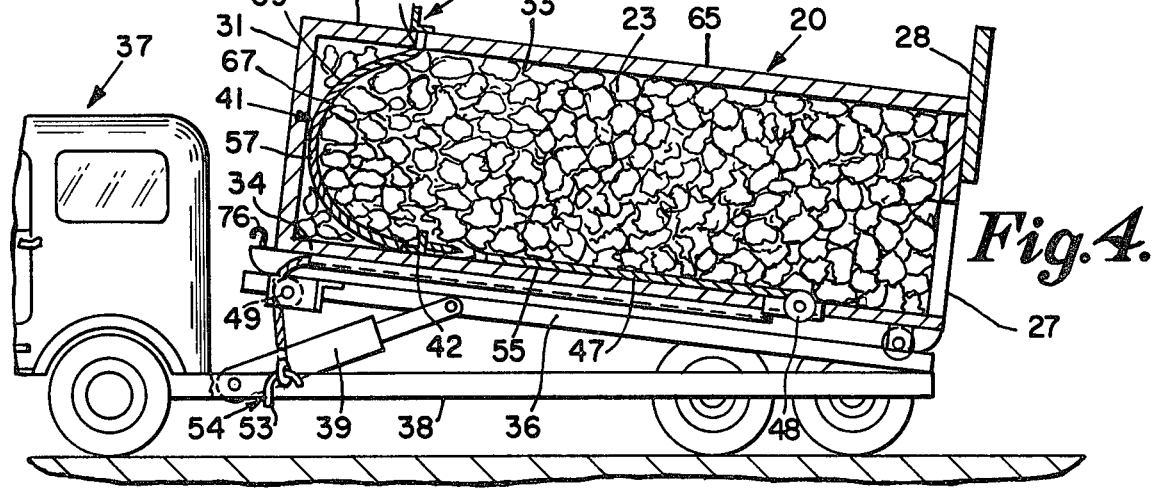
FIG. 4 is a side elevational view, similar to FIG. 2, showing the roll-off container on the truck and being lifted for discharge with the load release cables and bar instantly and progressively loosening the load from the walls of the container.

As shown in FIGS. 3–5 the large roll-off container 20, when full of the tightly compacted waste 23, is closed, sealed and rolled onto the tilt bed 36 of a tilt bed motor vehicle 37 having a frame 38 and hydraulic lift mechanism 39.

The instant load release system 41 of the invention, includes the cargo ejecting bar 42 which extends transversely of the floor 34 for substantially the full width of the inside of the container 20 and which is normally proximate the front of the container 20 as shown in FIG. 1. Ejection bar 42 is preferably an angle iron having a horizontal web 43 for riding along floor 34 and an upstanding, vertical, web 44 for serving as a scraper, or push, blade in separating the bottom 55 of the compacted load 23 from the floor 34. The bar 42 is about six feet in length from one side 45 to the other side 46 and the webs 44 and 45 are about four or five inches in width or height.

A flexible pull cable 47 extends rearwardly along floor 34 to a first pulley 48 and thence forwardly under floor 34 to a second pulley 49 and thence downwardly with an eye 51 at the terminal end 52 removably attached to the hook 53 on the frame 38 of vehicle 37. The hook 53 and the eye 51 constitute second anchoring means 54 and it will be apparent that, since there is no lost motion, the bar 42 will commence to move and separate the bottom 55 of load 23 from floor 34 immediately upon the commencement of lift of the tilt bed 36, the pull being continuous as shown in FIGS. 4 and 5.

The instant load release system 41 does not include any spring actuated, or cable actuated, return mechanism for bar 42. As shown in FIG. 1 the bar 42 is however connected at each opposite side 45 or 46 to one of at least two flexible, extension, cables 56 or 57. Each extension cable such as 56 normally extends in a loop forwardly as at 58, and upwardly as at 59 to a terminal end 61 affixed to first anchoring means 62 in the roof 35 of the container.

First anchoring means 62 is preferably a pair of angle irons 63 and 64 welded, or otherwise secured to the exterior 65 of roof 35 and each having a suitable integral element 66 extending through the roof and permanently affixed to one of the ends 61 of the extension cables 56 or 57. It will be understood that the forces exerted on the extension cables for loosening the front end 67 of the compacted, and often frozen, load 23 are tremendous and might tend to damage roof 35 if the force was not distributed by means 62. Element 66 is preferably a strong U-shaped bolt.

Figure 2:
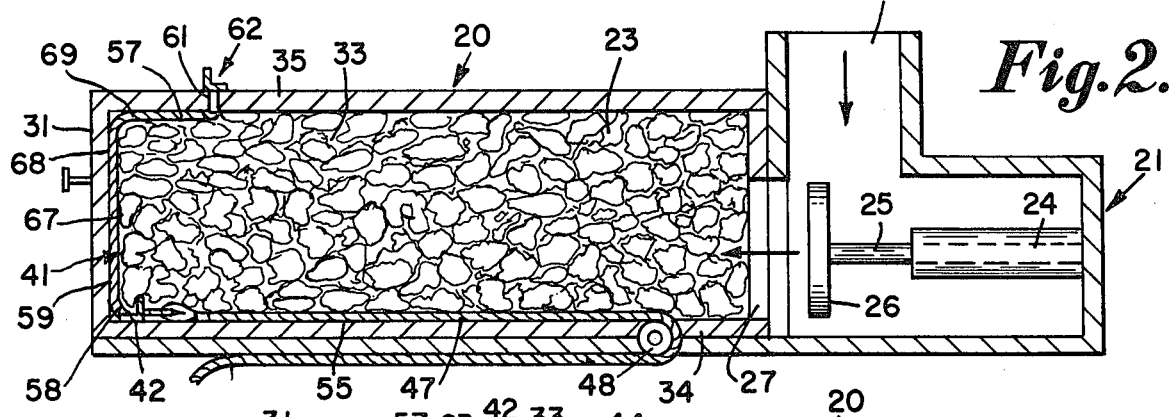
FIG. 2 is a view, similar to FIG. 1, showing the roll-off container filled compactly with trash, which may be frozen, or adhered to the walls and showing the load release cables fully extended.

As shown in FIG. 2, the bar 42 and the extension cables 56 and 57 are pushed forwardly to encompass the front end 67 of the load 23, by the pressure exerted in compactng the load and looped forwardly at 58 along floor 34, thence upwardly at 59 along the inside face 68 of front wall 31 and thence rearwardly at 69 along roof 35 to first anchoring means 62.

As best shown in FIGS. 4, 6 and 7 the instant movement of bar 42 is a rearward direction simultaneously causes instant tension on the extension cables 56 and 57, thereby exerting compression and squeezing on the front end 67 of compacted load 23 resulting in distortion of the front end which tends to pull the bottom face 55, front face 72, top face 73 and side faces 74 and 75 of the front end 67 away from any adherence to the corresponding inside faces of the container 20. This release effect, coupled with the release effect of the bar 42 along the bottom of the load enables gravity to discharge the load without requiring lifting to the full extend of hydraulic lift mechanism 39.

During transit the cable eye 51 may be attached to a suitable pin or hook 76 on container 20.

I claim:

1. The method of releasing the front end of a load of compacted waste frozen to the floor, front walls, side walls or roof of a roll-off container, by strong, heavy elongated cable means tautened by the upward inclination of said container, for rear end discharge of said load, said method comprising the steps of:

extending said cable means rearwardly along said floor, up the front end of said container and anchoring the terminal end thereof to the container roof;

compacting said load from the discharge end of said container to push said load against the front wall thereof while looping said cable means around the top, front and bottom of the front end of said load and then, during raising of said container for rear end discharge by gravity; tautening said cable means to straighten out the looped cable means, thereby exerting compressive, squeezing forces on the front portion of said load to release the same from any adherence to the inside faces of said container.

2. A method as specified in claim 1 wherein:

said step of exerting compressive, squeezing forces on said front portion includes the step of applying such forces by a pair of spaced apart cables each at a spaced distance inwardly from the sides of said load.

3. A method as specified in claim 1 wherein:

said step of exerting compressive, squeezing forces said front portion includes the step of applying such forces successively first on the bottom, then on the front and then on the top faces of said compacted load.

4. A method as specified in claim 1 plus:

the step of urging the bottom of said compacted load rearwardly while scraping the floor with an upstanding blade-like surface.

5. The method of dislodging a compacted load of waste from the inside of a sealed roll-off container while the load is being tilted on a tilt bed vehicle to discharge the load through a rear opening, said method comprising the steps of:

pressing a pair of laterally spaced flexible cables, anchored at their upper ends to the roof of said container, and normally loosely looped in the front inside thereof, against the inside faces of the roof, front wall and floor of said container, during compacting of waste in said container;

and then during unloading of said container by tilting the same, immediately, progressively, and continuously applying tension on the lower ends of said cables, in a rearward direction, to compress and squeeze the front portion of said load and free it from adhesion to the adjacent inside faces of the front of said container;

thereby assisting the force of gravity in releasing said load for discharge from said container.

* * * * *